United States Patent [19]

Motoki et al.

[11] Patent Number: 4,850,222

[45] Date of Patent: Jul. 25, 1989

[54] SENSOR UNIT

[75] Inventors: Yoshimitsu Motoki; Kiyohito Nakagawa; Morio Tada, all of Toyama, Japan

[73] Assignee: Hokuriki Electric Industry, Co., Ltd., Osawano, Japan

[21] Appl. No.: 139,802

[22] Filed: Dec. 30, 1987

[30] Foreign Application Priority Data

Aug. 7, 1987 [JP] Japan .......................... 62-121344[U]
Sep. 2, 1987 [JP] Japan .......................... 62-134089[U]

[51] Int. Cl.$^4$ ........................................ G01F 23/36
[52] U.S. Cl. ...................................... 73/317; 340/625; 338/33; 338/68
[58] Field of Search ............... 340/625; 338/33, 39, 338/41; 73/719, 725, 734, 746, 750, 317

[56] References Cited

U.S. PATENT DOCUMENTS

| 2,790,043 | 4/1957 | Clason | 338/39 |
|---|---|---|---|
| 2,943,302 | 6/1960 | Clason | 73/725 |
| 3,069,645 | 12/1962 | Henke | 73/725 |
| 3,600,950 | 8/1971 | Bergsma | 73/725 |
| 4,114,130 | 9/1978 | Sutton et al. | 73/317 |
| 4,318,075 | 3/1982 | Pudelko et al. | 338/162 |
| 4,441,364 | 4/1984 | Montie | 73/317 |
| 4,532,491 | 7/1985 | Rau et al. | 73/317 |
| 4,557,144 | 12/1985 | Lucchini | 73/317 |
| 4,642,602 | 2/1987 | Maisch et al. | 338/68 |
| 4,700,170 | 10/1987 | Weaver | 338/68 |
| 4,718,228 | 1/1988 | Bergsma | 73/725 |

FOREIGN PATENT DOCUMENTS

| 1262029 | 2/1968 | Fed. Rep. of Germany | 340/625 |
|---|---|---|---|
| 2830518 | 12/1979 | Fed. Rep. of Germany | 73/313 |
| 1336244 | 7/1962 | France | 340/625 |
| 58-97625 | 6/1983 | Japan | |
| 58-178219 | 10/1983 | Japan | |
| 1111071 | 4/1968 | United Kingdom | 73/317 |
| 1166418 | 10/1969 | United Kingdom | 338/33 |
| 2021271 | 11/1979 | United Kingdom | 73/725 |

Primary Examiner—William A. Cuchlinski, Jr.
Assistant Examiner—Thomas B. Will
Attorney, Agent, or Firm—Pearne, Gordon, McCoy & Granger

[57] ABSTRACT

A sensor unit is disclosed which is adapted to be used as a detector for a fuel gauge, an oil pressure gauge or the like for a vehicle. A variable resistor serving as a signal converting device is securely fitted at both ends thereof in board fixing grooves formed at a frame fixed on a fixing bracket, so that fixing of the variable resistor may be accomplished without using adhesives. Fixing and electrical connection of a connection conductor are attained by merely fitting the connection conductor in an extension restraining groove without soldering.

6 Claims, 3 Drawing Sheets

SENSOR UNIT

BACKGROUND OF THE INVENTION

1. Field of the Invention

This invention relates to a sensor unit used for a detector for a fuel gauge, a hydraulic gauge or the like of a vehicle, and more particularly to an improvement in a sensor unit for detecting a variation of an object to be detected such as a liquid level, hydraulic pressure or the like in the form of an electrical signal.

2. Description of the Prior Art

Conventionally, various kinds of sensor units have been proposed which are adapted to detect liquid pressure such as hydraulic pressure of a gasoline engine, liquid level of fuel in a fuel tank or the like. Such conventional sensor units typically include a signal converting means for converting the amount of movement of a drive arm shifted depending on a variation of an object to be detected (hereinafter referred to as "detected object") such as a liquid level, liquid pressure or the like into an electrical signal. A signal generated from the signal converting means is externally fed through a connection conductor for connecting an output electrode of the signal converting means and an output terminal provided on a protection cover with each other. Conventionally, as such a signal converting means is generally used a variable resistor which is so constructed that a linear resistor element is wound two or more times at predetermined intervals on an insulating substrate to form a wire wound resistor element and a contact of a slider is slid on the wire wound resistor element. However, it is known in the art that the variable resistor of this type exhibits various disadvantages.

In view of the disadvantages, the assignee proposed to use a variable resistor which includes a printed resistor board formed by depositing a resistor pattern and an output electrode on an insulating substrate by printing. Unfortunately, it was found that the variable resistor proposed has the following defects.

One of the defects is encountered with mounting of the substrate on a fixing bracket. In the above-described conventional variable resistor which uses the wire wound resistor, it is possible to fix the insulating substrate on a fixing bracket by riveting because the substrate may be formed in a manner to exhibit relatively high mechanical strength. On the contrary, in the variable resistor proposed by the assignee, a material for the insulating substrate is limited to that relatively low in mechanical strength such as ceramic or the like because it is required for the substrate to exhibit satisfactory printing characteristics. Accordingly, fixing of the insulating substrate on the fixing bracket by riveting tends to cause damage or breakage of the substrate. In order to avoid such a problem, those skilled in the art would take an approach of fixing the substrate on the bracket by means of adhesive. However, when a sensor unit is subjected to a high temperature and vibration during operation like a sensor unit for detecting hydraulic pressure of an engine of a vehicle, the adhesive is deteriorated to a degree sufficient to cause the substrate to be separated from the bracket. Also, use of adhesive requires much time for drying it and needs use of solvent, resulting in workability being deteriorated.

Another defect is that such a sensor unit is smallsized to a degree to fail to provide a sufficient interval between the output electrode and the resistor pattern, accordingly, it is required to carry out soldering between the output electrode and the connection conductor while taking much care to avoid adhesion of solder to the resistor pattern. Also, soldering flux often adheres onto a plurality of contact electrodes on the resistor pattern with which a contact of a slider is contacted. Such adhesion of the soldering flux leads to a variation of resistance of the resistor pattern.

SUMMARY OF THE INVENTION

The present invention has been made in view of the foregoing disadvantages of the prior art.

Accordingly, it is an object of the present invention to provide a sensor unit which is capable of accomplishing safe and firm fixing of a printed resistor board to ensure satisfactory operation for a long period of time.

It is another object of the present invention to provide a sensor unit which is capable of fittedly fixing a printed resistor board in a frame to accomplish fixing of the board without using any adhesive and damaging the board.

It is a further object of the present invention to provide a sensor unit which is capable of readily accomplishing fixing of a connection conductor and electrical connection between the connection conductor and an output electrode of a printed resistor board without using solder.

It is still another object of the present invention to provide a sensor unit which is capable of attaining the above-noted objects with a simple structure.

In accordance with the present invention, a sensor unit is provided. The sensor unit includes a drive arm moved depending on a variation of a detected object and a signal converting means for converting the amount of movement of the drive arm into an electrical signal. The signal converting means comprises a variable resistor which includes a printed resistor board comprising an insulating substrate and a resistor pattern and an output electrode each formed on the insulating substrate by printing. Also, the variable resistor includes a slider of which a contact is driven by the drive arm to be slid on the resistor pattern. The sensor unit further includes a protection cover provided with an output terminal, a connection conductor for accomplishing electrical connection between the output electrode of the signal converting means and the output terminal of the protection cover, and a frame fixed on a fixing bracket and having a pair of board fixing grooves arranged in a manner to interpose the printed resistor board therebetween. The printed resistor board is fixed in the frame in a manner to be fitted at both ends thereof in a pair of the board fixing grooves.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designates like or corresponding parts throughout; wherein.

DETAILED DESCRIPTION OF THE PREFERRED EMBODIMENT

Now, a sensor unit according to the present invention will be detailedly described hereinafter with reference to the accompanying drawings.

Figure 1:
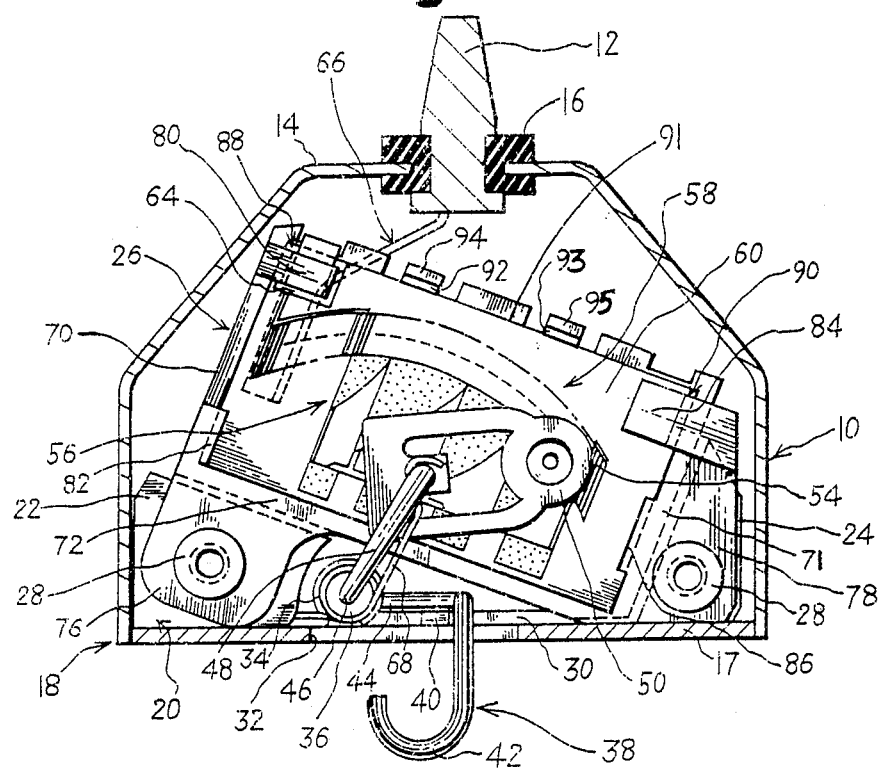
FIG. 1 is a front elevation view showing an essential part of an embodiment of a sensor unit according to the present invention.
Figure 2:
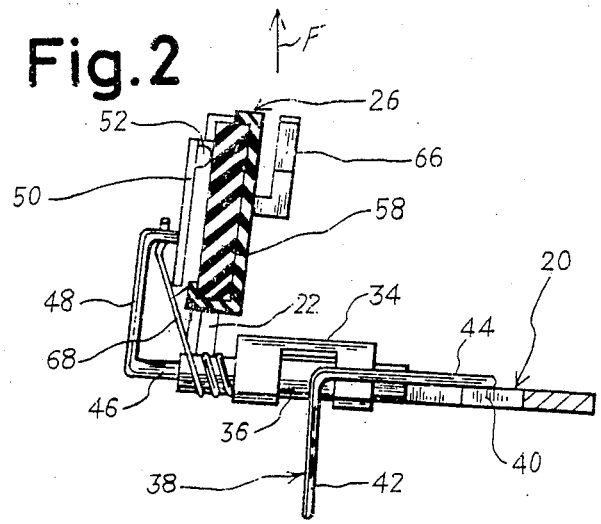
FIG. 2 is a schematic view partly in section showing a mechanism for pivotally moving a slider.
Figure 3:
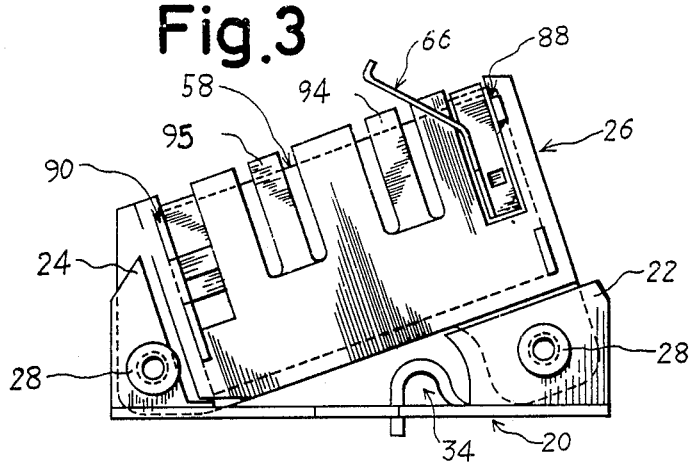
FIG. 3 is a rear elevation view showing a manner of fixing of a substrate in a frame fixed at a bracket.

FIG. 1 shows an embodiment of a sensor unit according to the present invention. A sensor unit of the illustrated embodiment is adapted to be used as a detector for an oil pressure gauge which serves to convert a variation of a detected object such as liquid pressure or the like into an electrical signal to detect liquid pressure depending on the electrical signal. In the illustrated embodiment, a variable resistor is used as a signal converting means for converting a variation of a detected object into an electrical signal.

The sensor unit of the illustrated embodiment, as shown in FIG. 1, includes a protection cover 10 which has an output terminal 12 fixed on a central portion of one end 14 thereof through insulating bushings 16. The protection cover 10 also has a bottom plate 17 fitted in an opening provided at the other end 18 thereof on which a fixing bracket 20 formed of a conductive material is fixed. The fixing bracket 20 is provided with rising or vertical portions 22 and 24 on which a frame 26 formed of an insulating material is fixed by means of rivet members 28. The fixing bracket 20 is formed at a central portion thereof with an opening 30 and correspondingly the bottom plate 16 is formed with an opening 32 aligned with the opening 30. Also, the fixing bracket 20 is provided with a holding portion 34 for holding a bearing portion 36 of a drive arm 38 and a stopper portion 40 for limiting movement of the drive arm 38.

The drive arm 38 includes an abutment portion 42 of which one end is abutted against a distal end of a movable member (not shown) driven due to a variation of liquid pressure, a curved portion 44 extending at one end thereof from the other end of the abutment portion 42 and bent at the other end thereof into a U shape, an axis portion 46 connected at one end thereof to the other end of the curved portion 44, and a pivotal portion 48 perpendicularly extending at one end thereof from the other end of the axis portion 46 and bent at the other end thereof so as to be parallel with the axis portion 46. The bearing portion serves to pivotally hold the axis portion 46.

The sensor unit also includes a slider 50 fixed on a tip end of the pivotal portion 48 of the drive arm 38. The slider 50 includes a contact 52 which is adapted to selectively contact with a plurality of contact electrodes 54 on a resistor pattern 56 of a printed resistor board 58. The printed resistor board 58 comprises an insulating substrate 60 which is formed of a suitable insulating material such as ceramic and exhibits excellent printing characteristics and durability, and the resistor pattern 56 formed into a predetermined shape and an output electrode 64 which are deposited on the substrate 60 by printing. The output electrode 64 is electrically connected through a connection conductor 66 to the output terminal 12.

Reference numeral 68 designates a return spring 68 for applying return force to the drive arm 38. When force is upwardly applied from the movable member (not shown) shifted depending on a variation of a detected object such as liquid pressure to the abutment portion 42 of the drive arm 38 as indicated at an arrow F in FIG. 1, the drive arm 38 is pivotally moved about the axis portion 46 in a counterclockwise direction. Thus, it will be noted that the drive arm 38 converts linear movement into rotational movement to pivotally move the slider 11. This causes a resistance value between the output terminal 12 and the fixed bracket 20 to be varied, resulting in a variation of a detected object being detected.

Now, mounting of the printed resistor board 58 and connection conductor 66 will be described with reference to FIGS. 1 and 3 to 6.

The frame 26 includes a pair of elongated side walls 70 and 71 opposite to each other a predetermined interval and an elongated bottom wall 72 and a rear wall 74 each for connecting the side walls 70 and 71 to each other. The bottom wall 72 is provided with a first mounting portion 76 downwardly projecting therefrom and the side wall 71 is provided with a second mounting portion 78 outwardly projecting therefrom. The first and second mounting portions 76 and 78 are fixed on the fixed bracket 20 by riveting.

The side wall 70 is provided at an upper portion thereof with a first projection 80 having an inner surface parallel to a surface of the printed resistor board 58 and at a lower portion thereof with a second projection 82. Likewise, the side wall 71 is provided at an upper portion thereof with a third projection 84 and at an intermediate portion thereof with a fourth projection 86 which forms a part of a groove for fixing the printed resistor board 58. More specifically, a first board fixing groove 88 in which one end of the printed resistor board 58 is fitted is formed at a part thereof by the first and second projections 80 and 82. A second board fixing groove 90 which is opposite to the first board fixing groove 88 and in which the other end of the printed resistor board 58 is fitted is formed at a part thereof by the third and fourth projections 84 and 86.

The printed resistor board 58 is mounted in the frame 26 by inserting both ends thereof in the grooves 88 and 90 from a side opposite to the bottom wall 72 of the frame 26. Removal or dislocation of the printed resistor board 58 from the frame 26 is prevented by engaging an upper end 91 of the printed resistor board 58 with engagement portions 92 and 93 formed at tip ends of elastic engagement members 94 and 95 arranged on the rear wall 74. The rear wall 74 of the frame 26, as shown in FIGS. 4A to 4D, is formed with two wide slits 96 and 97, which are arranged separate from each other at a suitable interval in a lateral direction of the rear wall 74. The elastic engagement members 94 and 95 each are formed into an elongated shape and so as to upwardly extend from a central portion of a bottom of each of the slits 96 and 97 in a width direction thereof. The elastic engagement members 94 and 95 each are formed to have a thickness smaller than the rear wall 74 and arranged so as to be flush at a front surface thereof with that of the rear wall 74.

Figure 5:
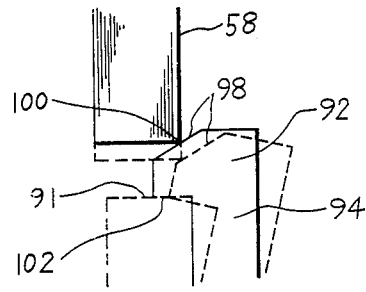
FIG. 5 is a schematic view showing a state of mounting of a substrate.

The engagement portions 92 and 93 provided at the tip ends of the elastic engagement members 94 and 95, as noted from FIG. 5 in which only the engagement portion 92 is enlargedly shown, each are formed with a slanting surface 98 abutted against the printed resistor board 58. As the printed resistor board 58 is inserted at both ends thereof in the board fixing grooves 88 and 90, the elastic engagement member 94 is bent in a direction away from the board 58 as shown in FIG. 5 while the board 58 is slid at an edge 100 thereof on the slanting surface 98. Then, when the edge 100 of the board 58 is abutted against the bottom wall 72 of the frame 26, the elastic engagement member 94 returns to its original state. This leads to engagement between the engagement portion 92 and the upper end 91 of the board 58 to prevent dislocation of the board from the frame 26. In the illustrated embodiment, the engagement is accomplished through a jaw portion 102 provided at the engagement portion 92. When the edge 100 of the board 58 is abutted against the bottom wall 72, the elastic engagement members 94 and 95 cooperate with the projections 80, 82, 84 and 86 to securely fix the board 58 in the frame 26.

Now, mounting of the connection conductor 66 on the output electrode 64 of the printed resistor board 58 fixed in the frame 26 as described above will be described hereinafter.

Figure 4A:
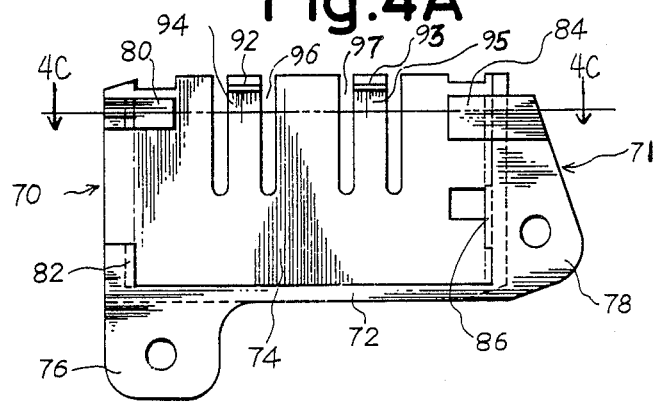
FIG. 4A is a front elevation view showing a frame used in the embodiment of FIG. 1.
Figure 4B:
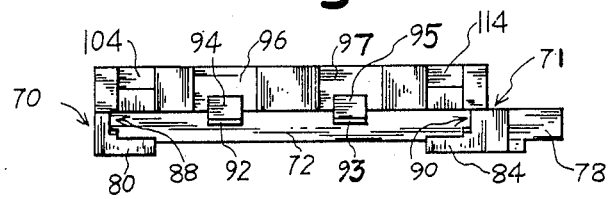
FIG. 4B is a plan view of the frame shown in FIG. 4A.
Figure 4C:
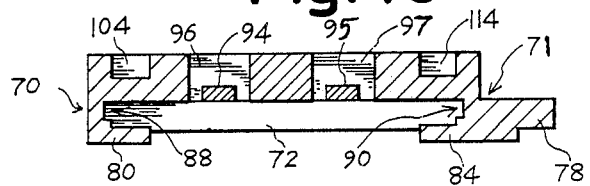
FIG. 4C is a sectional view taken along line 4C—4C of FIG. 4A.
Figure 4D:
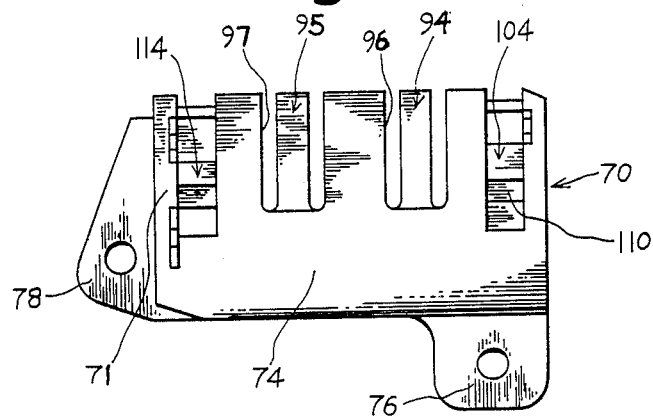
FIG. 4D is a rear elevation view of the frame shown in FIG. 4A.

The rear wall 74 of the frame 26, as shown in FIG. 4D, is formed on a rear side thereof with an extension restraining groove 104 on which a mount 106 of the connection conductor 66 is mounted and in which an extension 108 (FIGS. 6A and 6B) of the conductor 66 is fitted in a manner as described below. The groove 104 is provided at a lower side portion thereof with a recess 110 in which a projection 112 formed on the extension 108 is fitted. The rear wall 74 is also formed with another extension restraining groove 114. The groove 114 is provided for the purpose of shifting a position of mounting of the connection conductor 66 depending on a circuit pattern on the printed resistor board 58.

Figure 6A:
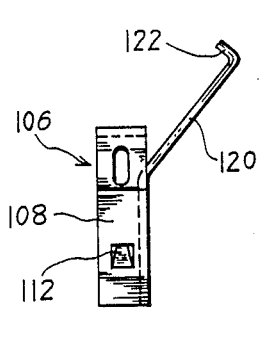
FIGS. 6A and 6B are a front elevation view and a side elevation view showing a connection conductor, respectively.
Figure 6B:
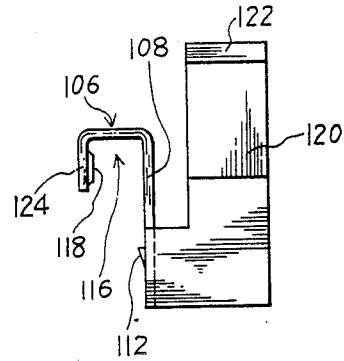

The connection conductor 66 is formed of an elastic and conductive material such as phosphor bronze into such a shape as shown in FIGS. 6A and 6B. In the connection conductor 66, the mount 106 includes a mounting groove 116 in which a part of the end of the board 58 and a part of an end of the rear wall 74 are pressedly fitted and a contact 118 pressedly contacted with the output electrode 64. The extension 108 is formed to extend from the mount 106. The connection conductor 66 further includes a terminal 120 formed with a press contact 122 which is pressedly contacted with the output terminal 12 when one end of the terminal 120 is fixed at the extension 108 and the protection cover 10 is mounted at the other end of the terminal 120.

The mount 106 is formed into a substantially U shape, and the contact 118 is formed by extruding, toward the mounting groove 116, a part of a front wall 124 which is one of side walls of the mount 106 defining the groove 116 therebetween. The projection 112 is formed on a lower side portion of the extension 108 in a manner to project toward the front wall 124. The projection 112 is fitted in the recess 110 of the extension restraining groove 104 formed at the rear wall of the frame 26 to prevent disconnection of the connection conductor 66. Alternatively, the disconnection may be effectively prevented by providing the extension 108 with a recess and correspondingly providing the groove 104 with a projection as well.

The terminal 120 is inclined at a portion thereof adjacent to the press contact 122 so that it may generate elastic force. The so-generated elastic force permits mechanical and electrical connection between the press contact 122 and the output terminal 12 to be satisfactorily accomplished by merely abutting the press contact 122 against an end surface of the output terminal 12 and without using any solder. Formation of a recess at the end surface of the output terminal 12 and fitting of the press contact 122 in the recess ensure much firmer connection therebetween.

The connection conductor 66 is fixed with respect to the printed resistor board 58 and frame 26 when a part of the end of the board 58 and a part of the end of the frame 26 (a part of the extension restraining groove 104) are forcedly fitted in the mounting groove 116 of the mount 106, the extension 108 is fitted in the extension restraining groove 104, and the projection 112 of the extension 108 is fitted in the recess 110 of the groove 104. The front wall 124 of the mount 106 is pressedly fitted in a space defined between a surface of the board 58 and an inner surface of the first projection 80. This causes the front wall 124 to be forcedly pressed toward the board 58 to carry out electrical connection between the contact 118 and the output terminal 15, to thereby prevent deformation of the mount 106.

When the protection cover 10 is mounted, the output terminal 12 is abutted against the press contact 122 of the connection conductor 66 to apply pressing force to the whole connection conductor 66. However, application of the force does not cause movement and/or release of the connection conductor from a fixed position because the mount 106 and extension 108 of the connection conductor 66 are firmly fixed with respect to the frame 26. Thus, it will be noted that mechanical and electrical connection of the connection conductor 66 may be positively attained without using solder.

As described above, the illustrated embodiment is so constructed that the printed resistor board 58 is fixedly fitted in the board fixing grooves 88 and 90 of the frame 26 fixed on the fixing bracket 20, accordingly, it may be substantially free of damage of the board 58 as compared with the prior art in which fixing of a printed resistor board is carried out by riveting. Also, the illustrated embodiment effectively eliminates disadvantages such as deterioration of workability and separation of the board due to heat or vibration which are encountered with the prior art wherein adhesive is used.

In the illustrated embodiment, the first to fourth projections 80, 82, 84 and 86 of the frame 26 form the side walls 70a and 70b with the board fixing grooves 88 and 90, respectively. Such construction causes discontinuous formation of the grooves to be observed when viewed from a front side of the frame 26. However, extension of each of the projections 82 and 86 in a lengthwise direction thereof as indicated at dashed lines in FIG. 4A results in continuous formation of the grooves.

As can be seen from the foregoing, the present invention is so constructed that the printed resistor board may be fittedly fixed in the frame. Such construction accomplishes secure fixing of the board without using adhesive and damaging the board. Also, in the present invention, the connection conductor is fixed by merely pressedly fitting a part of the end of each of the printed resistor board and frame in the mounting groove of the mount of the connection conductor and fitting the extension of the conductor in the extension restraining groove of the frame, so that the fixing may be readily performed without using solder. Also, such construction attains electrical connection between the connection conductor and the output electrode of the printed resistor board.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A sensor unit comprising:

a drive arm moved depending on a variation of a detected object;

a signal converting means for converting the amount of movement of said drive arm into an electrical signal;

said signal converting means comprising a variable resistor which includes a printed resistor board comprising an insulating substrate and a resistor pattern and an output electrode each formed on said insulating substrate by printing and a slider of which a contact is driven by said drive arm so as to be slid on said resistor pattern;

a protection cover provided with an output terminal;

a connection conductor for accomplishing electrical connection between said output electrode of said signal converting means and said output terminal of said protection cover;

a frame fixed on a fixing bracket and having a pair of board fixing grooves arranged in a manner to interpose said printed resistor board therebetween;

said printed resistor board being fixed in said frame in a manner to be fitted at both ends thereof in a pair of said board fixing grooves;

said frame including a pair of side walls respectively formed with one of said pair of said board fixing grooves and a bottom wall and a rear wall each connecting said side walls to each other; and said rear wall being provided with elastic engagement members elastically engaged with an end of said insulating substrate opposite to an end thereof abutted against said bottom wall when said insulating substrate is fitted in said pair of said board fixing grooves.

2. A sensor unit as defined in claim 1, wherein said board fixing grooves are discontinuously formed in a lengthwise direction of said frame.

3. A sensor unit comprising:

a drive arm moved depending on a variation of a detected object;

a signal converting means for converting the amount of movement of said drive arm into an electrical signal;

said signal converting means comprising a variable resistor which includes a printed resistor board comprising an insulating substrate and a resistor pattern and an output electrode each formed on said insulating substrate by printing and a slider of which a contact is driven by said drive arm so as to be slid on said resistor pattern;

a protection cover provided with an output terminal;

a connection conductor for accomplishing electrical connection between said output electrode of said signal converting means and said output terminal of said protection cover;

a frame fixed on a fixing bracket and having a pair of board fixing grooves arranged in a manner to interpose said printed resistor board therebetween;

said printed resistor board being fixed in said frame in a manner to be fitted at both ends thereof in a pair of said board fixing grooves;

said connection conductor comprising a mount on which said printed resistor board is mounted, an extension extending from said mount, and a terminal fixed at one end thereof at said extension and formed at the other end thereof with a press contact pressedly contacted with said output terminal when said protection cover is mounted;

said mount including a mounting groove in which the respective ends of said printed resistor board and frame are pressedly fitted and a contact pressedly contacted with said output electrode; and said extension being fitted in an extension restraining groove provided at said frame.

4. A sensor unit as defined in claim 3, wherein one of said pair of said side walls of said frame is provide with a projection having an inner surface extending substantially parallel to a surface of said printed resistor board; and said connection conductor having a front wall forming one of said mounting grooves of said mount, said front wall being pressedly fitted in a gap formed between said surface of said printed resistor board and said inner surface of said projection.

5. A sensor unit as defined in claim 3, wherein one of said extension of said connection conductor and said extension restraining groove of said frame is formed with a recess and the other is formed with a projection fittedly engaged with said recess.

6. A sensor unit as defined in claim 3, wherein said mounting groove is formed into a substantially U-shape.

* * * * *

UNITED STATES PATENT AND TRADEMARK OFFICE
CERTIFICATE OF CORRECTION

PATENT NO. : 4,850,222

DATED : July 25, 1989

INVENTOR(S) : Yoshimitsu Motoki, et al.

It is certified that error appears in the above-identified patent and that said Letters Patent is hereby corrected as shown below:

On the face of the patent, Assignee should be "Hokuriku" instead of --Hokuriki--.

Under References Cited, Col. 2, line 3, "4,718,228" should be --4,718,278--.

In the Abstract, line 7, "adhesives" should be --adhesive--.

Col. 1, line 65, "smallsized" should be --small-sized--.

Signed and Sealed this

Fifth Day of June, 1990

Attest:

HARRY F. MANBECK, JR.

*Attesting Officer*       *Commissioner of Patents and Trademarks*